(12) United States Patent
Manolescu

(10) Patent No.: US 7,508,687 B2
(45) Date of Patent: Mar. 24, 2009

(54) POWER SUPPLY THAT READS POWER REQUIREMENT INFORMATION ACROSS A DC POWER CORD FROM A LOAD

(76) Inventor: Mihai-Costin Manolescu, 215 Union Ave., #349, Campbell, CA (US) 95008

( * ) Notice: Subject to any disclaimer, the term of this patent is extended or adjusted under 35 U.S.C. 154(b) by 422 days.

(21) Appl. No.: 11/198,288

(22) Filed: Aug. 3, 2005

(65) Prior Publication Data

US 2007/0030715 A1    Feb. 8, 2007

(51) Int. Cl.
*H02M 7/217*    (2006.01)
(52) U.S. Cl. ........................................ 363/89
(58) Field of Classification Search ............... 363/84, 363/89, 125, 127
See application file for complete search history.

(56) References Cited

U.S. PATENT DOCUMENTS

| | | | |
|---|---|---|---|
| 5,210,519 A | 5/1993 | Moore | 340/310.06 |
| 6,064,177 A | 5/2000 | Dixon | 320/111 |
| 6,300,881 B1 | 10/2001 | Yee et al. | 340/870.02 |
| 6,538,341 B1 | 3/2003 | Lang | 307/18 |
| 6,608,552 B1 | 8/2003 | Fogel et al. | 340/310.01 |
| 6,791,853 B2* | 9/2004 | Afzal et al. | 363/142 |
| 6,903,950 B2* | 6/2005 | Afzal et al. | 363/142 |
| 7,274,175 B2* | 9/2007 | Manolescu | 323/267 |
| 2007/0030716 A1* | 2/2007 | Manolescu | 363/84 |

* cited by examiner

*Primary Examiner*—Jeffrey L Sterrett
(74) *Attorney, Agent, or Firm*—Imperium Patent Works LLP; T. Letter Wallace

(57) ABSTRACT

A power supply device that is capable of outputting multiple different output voltages is coupled by a DC power supply cord to an electrical device. An unpowered memory in the electrical device stores information about the power requirements of the electrical device (for example, the DC supply voltage required). In a first time period, when the power supply device is not powering the electrical device, the power supply device sends an energizing pulse train across the power cord. The electrical device captures energy from the pulse train. In a second time period, the electrical device uses the captured energy to transmit the information back to the power supply device across the power cord as pulses. The power supply device uses the information read back from the electrical device to output the appropriate DC supply voltage for the electrical device onto the power cord.

23 Claims, 5 Drawing Sheets

POWER SUPPLY THAT READS POWER REQUIREMENT INFORMATION ACROSS A DC POWER CORD FROM A LOAD

BACKGROUND INFORMATION

Small consumer electrical devices (for example, digital cameras, digital music players, cellular telephones, personal digital assistants, laptop computers) typically have a jack or socket for receiving DC (direct current) voltage power. An AC-to-DC converter is typically supplied with the electrical device. The AC-to-DC converter has a wall plug for plugging the AC-to-DC converter into an AC wall socket. The AC-to-DC converter also has a power cord that terminates in a plug. To power the electrical device from power received from the wall socket, the plug of the AC-to-DC converter is plugged into the receiving DC power input socket of the electrical device. The electrical device is-then powered by a DC voltage received from the converter.

A consumer may have many different electrical devices, each of which is to be powered from a different DC voltage and may have a different type of DC power input socket. As a result, the consumer may have a confusing mess of similar, yet different, AC-to-DC converters for powering these many consumer devices. It would be nice for the consumer to have a single AC-to-DC converter that would be usable to power any one of the multiple different electrical devices.

A device sometimes called a universal AC-to-DC converter exists. The power cord of a universal AC-to-DC converter typically terminates in a plurality of plugs of different types and sizes. Hopefully, one of the plugs will fit into the DC voltage input power socket of an electrical device to be powered. If one of the plugs fits, then the consumer can manipulate a switch on the AC-to-DC converter to select one of a plurality of possible DC output voltages. The AC-to-DC converter may also include a switch for switching the polarity of the DC voltage that is output onto the contacts of the adapter's plugs.

Such universal AC-to-DC converters are, unfortunately, considered cumbersome to use. In some cases, the switch can inadvertently be moved when the converter is in use, resulting in an improper and potentially damaging voltage being applied to the electrical device. Moreover, the number of different selectable output voltages is often quite limited due to the expense of providing a large, many position switch to select the output voltage.

In addition to the universal AC-to-DC converter being cumbersome to use, a universal AC-to-DC converter does not provide a simple automatic way of determining whether the AC-to-DC converter will be able to supply enough output current to power a desired electrical device properly. The consumer is left to check the specifications of the electrical device to be powered with the output capabilities of the universal converter. This is an inconvenient exercise.

An elegant solution is desired.

SUMMARY

A power supply device includes a programmable DC power supply that is capable of outputting a DC output supply voltage onto a plug of at the end of a power cord. The power supply device also contains a DC-Identification Controller (DC-ID CNTR).

An electrical device is coupled to receive a DC supply voltage via the power cord from the power supply device. The electrical device includes a DC load to be powered as well as a DC-Identification device (DC-ID). The DC-ID contains a memory that stores information about the power requirements of the electrical device.

The DC-ID CNTR in the power supply device is AC coupled through the power cord to the DC-ID in the electrical device. A voltage output lead of the programmable DC power supply in the power supply device is DC coupled via the power cord to the DC load in the electrical device.

Initially, the DC-ID in the electrical device is unpowered. The power supply device is not supplying DC supply power to the electrical device. When the power supply device is not powering the electrical device, the DC-ID CNTR in the power supply device sends an AC signal across the power cord to the DC-ID in the electrical device. The AC signal is present on the power cord as a pulse train.

The DC-ID captures energy from the AC signal. The DC-ID uses the captured energy to read the information out of its memory. Once the power supply device has stopped driving the AC signal onto the power cord, then the DC-ID in the electrical device uses the captured energy to transmit the information back to the DC-ID CNTR in the power supply device across the power cord. The information is communicated across the power cord in the form of another AC signal.

The DC-ID CNTR receives the AC signal, extracts the information, and uses the information to control the programmable DC power supply so that the programmable DC power supply outputs the appropriate DC supply voltage for the electrical device onto the power cord. Because the voltage output lead of the programmable DC power supply is DC coupled through the power cord to the DC load, the programmable DC power supply powers the DC load with the correct DC supply voltage. In one embodiment, the DC-ID CNTR is integrated as part of a power management integrated circuit or a switching-mode power supply controller of a power supply.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
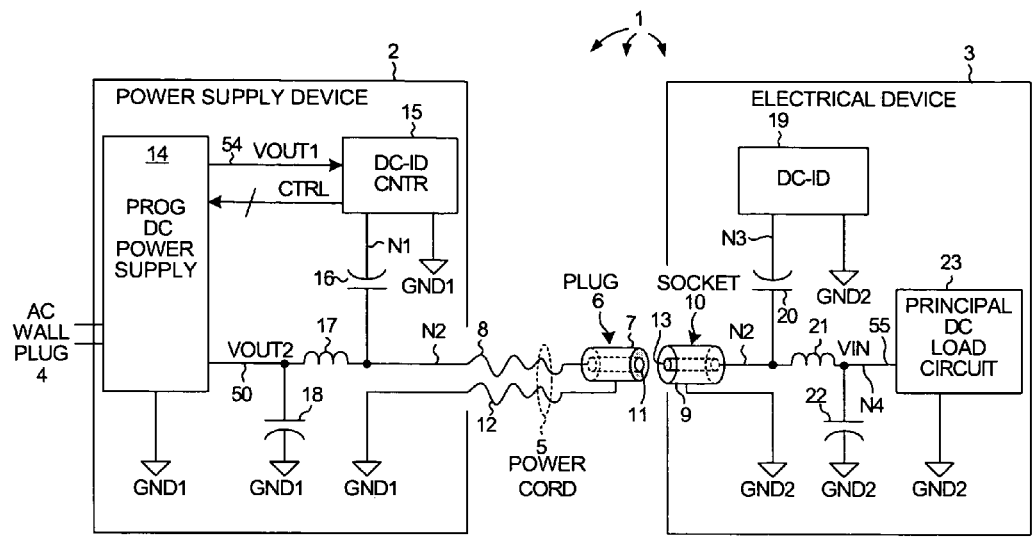
FIG. 1 is a diagram of a system 1 involving a power supply device 2 and an electrical device 3.

FIG. 1 is a diagram of a system 1 in accordance with one novel aspect. System 1 includes a power supply device 2 and an electrical device 3. Power supply device 2 includes an AC wall plug 4. When the AC wall plug 4 is plugged into an AC wall socket (not shown), the power supply device 2 draws power from the wall socket. Power supply device 2 also includes a power cord 5 that terminates in a DC power supply connector 6. In the present example, DC power supply connector 6 is a two-contact male barrel plug often used to supply DC power to electrical devices. Plug 6 has an outer barrel-shaped conductive contact 7 that is coupled to a first conductor 8 of the power cord 5. Barrel contact 7 is adapted to engage a female barrel shaped contact 9 of a female two-contact socket 10 of the electrical device. Plug 6 also has a female inner contact 11 that is coupled to a second conductor 12 of power cord 5. Female inner contact 11 of plug 6 is adapted to engage a pin-like inner contact 13 of socket 10 of electrical device 3.

Power supply device 2 includes power cord 5, plug 6, a programmable DC power supply 14, a DC-Identification Controller (DC-ID CNTR) 15, a first capacitor 16, an inductor 17, and a second capacitor 18. In this embodiment, inductor 17 has an inductance of 10 nH and first capacitor 16 has a capacitance of 47 nF.

Electrical device 3 includes socket 10, a DC-Identification Device (DC-ID) 19, a first capacitor 20, an inductor 21, a second capacitor 22, and the principal DC load circuit to be powered 23. In this embodiment, inductor 21 has an inductance of 10 nH and first capacitor 20 has a capacitance of 47 nF.

DC-ID CNTR 15 in power supply device 2 is AC coupled through conductor 8 to DC-ID 19 in electrical device 3. The voltage output lead 50 of programmable DC power supply 14 is DC coupled through conductor 8 to the DC power supply input lead 55 of the principal DC load 23 of electrical device 3.

Figure 2:
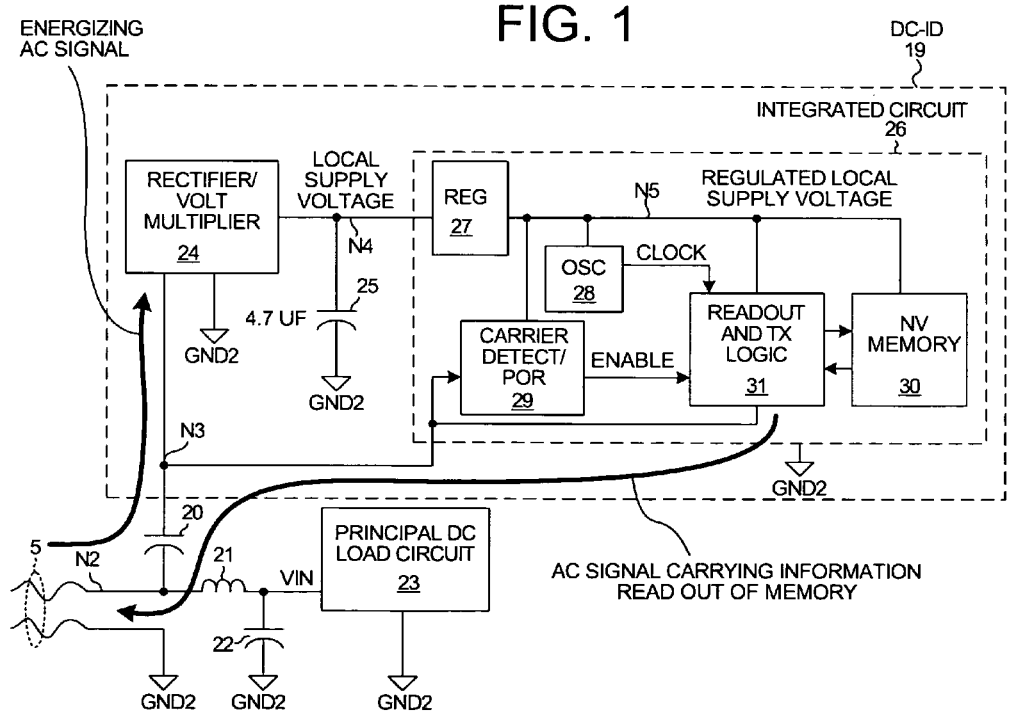
FIG. 2 is a more detailed diagram of electrical device 3 of FIG. 1.

FIG. 2 is a more detailed diagram of electrical device 3 showing details of DC-ID 19. DC-ID 19 includes a rectifier and voltage multiplier circuit 24, an energy storage capacitor 25, and an integrated circuit 26. Integrated circuit 26 is a low-voltage CMOS integrated circuit that includes a voltage regulator 27, an on-chip oscillator 28, carrier detect circuitry 29, an amount of non-volatile memory 30, and readout and transmitting logic circuitry 31.

Figure 3:
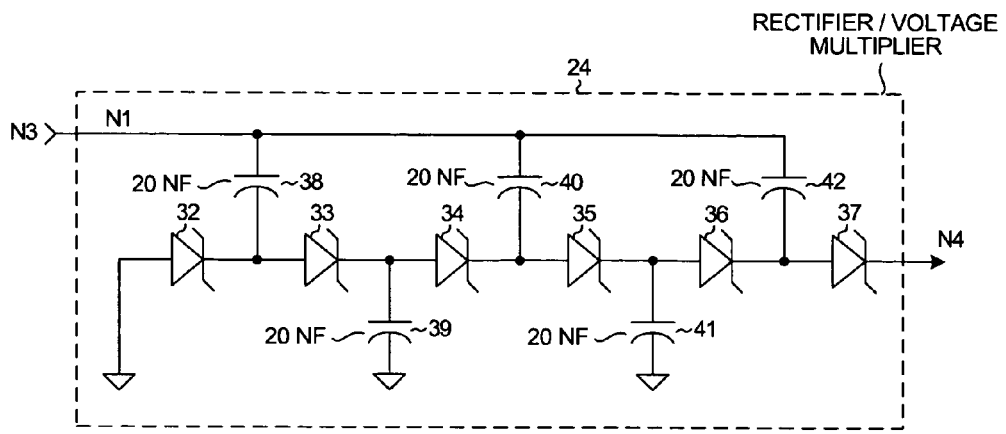
FIG. 3 is a diagram of the rectifier and voltage multiplier of FIG. 2.

FIG. 3 is a more detailed diagram of rectifier and voltage multiplier circuit 24. Rectifier and voltage multiplier circuit 24 is a three-stage Cockcroft-Walton multiplier made out of discrete components. Rectifier and voltage multiplier circuit 24 includes a plurality of low-threshold voltage Schottky diodes 32-37 and a plurality of capacitors 38-42.

Figure 4:
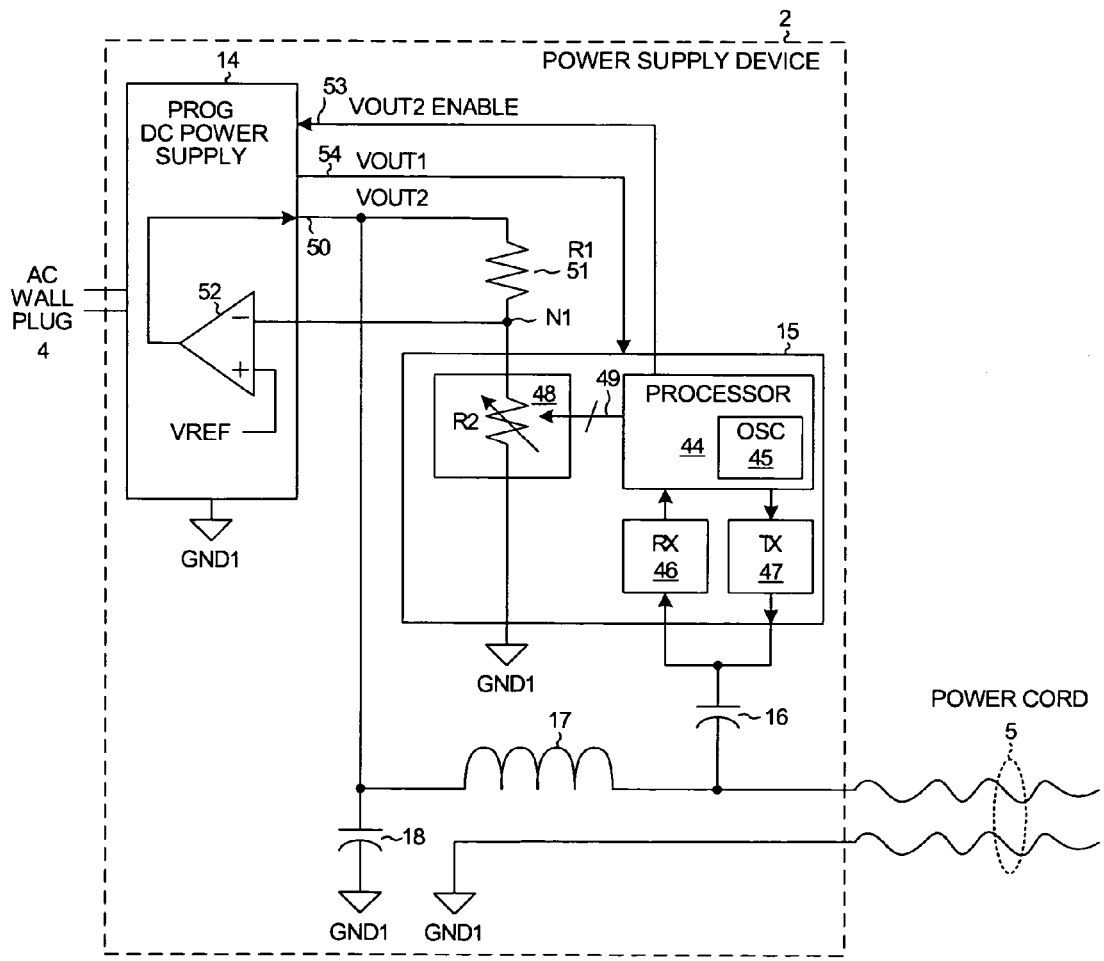
FIG. 4 is a more detailed diagram of power supply device 2 of FIG. 1.

FIG. 4 is a more detailed diagram of power supply device 2. DC-ID CNTR 15 is an integrated circuit that includes an instruction-executing processor 44 that is clocked by an on-chip oscillator 45, receiving circuitry 46, transmitting circuitry 47, and a digitally controlled variable resistor 48. Variable resistor 48 may, for example, be a digital potentiometer involving a resistor ladder and an analog multiplexer. Processor 44 controls the resistance of variable resistor 48 by controlling the digital values on control lines 49. Programmable DC power supply 14 is a typical programmable DC power supply that outputs a programmable voltage VOUT2 onto voltage output terminal 50. The DC amplitude of the voltage VOUT2 output onto terminal 50 is controllable by controlling the magnitude of the resistance R2 of variable resistor 48. The DC amplitude of the voltage output VOUT2 is given by: VOUT2=VREF(1+(R1/R2)), where VREF is a reference voltage (for example, 1.25 volts), where R1 is the resistance of discrete resistor 51, and where R2 is the resistance of variable resistor 48. Device 52 is a differential amplifier in a control loop that has a high current output capability. The details of the control loop of the programmable DC power supply 14 are not illustrated. Any suitable power supply circuit can be used. The control loop illustration and differential amplifier symbol of FIG. 4 are shown in order to explain the manner of controlling a DC power supply using variable resistor 48.

Programmable DC power supply 14 can be disabled from driving a voltage onto output terminal 50 by deasserting the signal VOUT2 ENABLE on input terminal 53. Programmable DC power supply 14 can be enabled to drive a voltage onto terminal 50 by asserting the signal VOUT2 ENABLE onto input terminal 53. Programmable DC power supply 14 also outputs another supply voltage VOUT1 onto output terminal 54. Supply voltage VOUT1 provides constant power to DC-ID CNTR 15 and is not disabled by VOUT2 ENABLE.

Operation of system 1 of FIG. 1 is described below in connection with the waveform diagrams of FIGS. 5-8 and the flowchart of FIG. 9. Initially, DC-ID 19 and the principal DC load circuit 23 of electrical device 3 are unpowered. When electrical device 3 is to be powered by power supply device 2, plug 6 of power supply device 2 is plugged into the DC voltage supply socket 10 of electrical device 3. Programmable DC power supply 14 of power supply device 2 is disabled and is not driving any DC voltage onto VOUT2 output terminal 50. There is no significant DC voltage between the two conductors 8 and 12 of power cord 5. The supply voltage VOUT1 is, however, being output from programmable DC power supply 14 to DC-ID CNTR 15. The processor 44 of DC-ID CNTR 15 is powered and operating.

Figure 5:
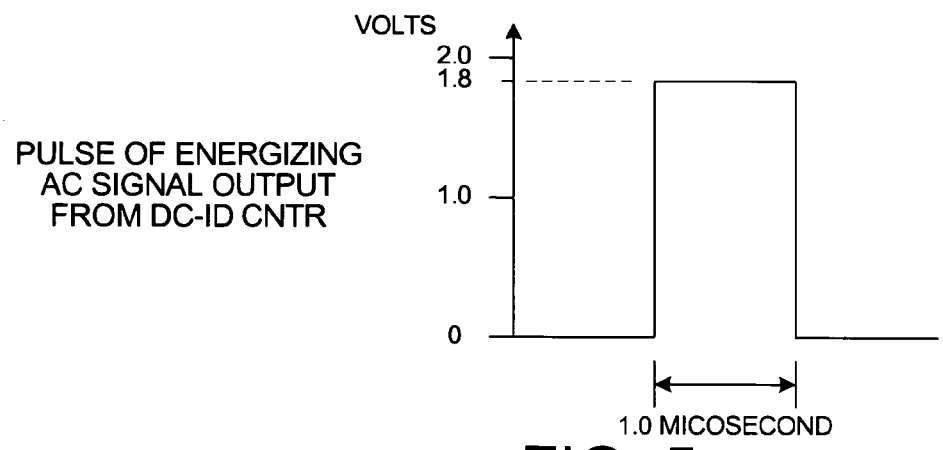
FIG. 5 is a waveform diagram of an energizing pulse as output by DC-ID CNTR onto node N1 of FIG. 1. The waveform is also representative of a digital signal as output by DC-ID onto node N3 during the communication of information from electrical device 3 to power supply device 1.

Once power supply device 2 is plugged into electrical device 3, then DC-ID CNTR 15 outputs a digital pulse train onto node N1. This digital pulse train is considered an AC signal. In the present example, this pulse train has a 1.8 volt magnitude. FIG. 5 is a diagram of one of the pulses.

The digital pulse train is AC coupled through capacitor 16 onto node N2 and appears on node N2 as a pulse train of spike-shaped pulses. Node N2 is the DC power supply conductor 8 of power cord 5. The pulse train of spike-shaped pulses on node N2 is also considered an AC signal.

Figure 6:
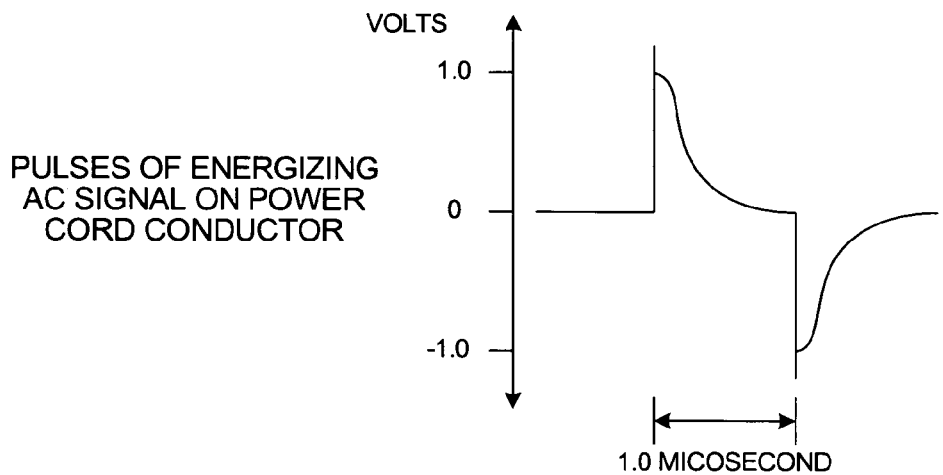
FIG. 6 is a waveform diagram of two energizing pulses as the pulses appear on conductor 8 of power cord 5. The waveform is also representative of pulses on conductor 8 of power cord 5 during the reading back of information from electrical device 3 to power supply device 1.

FIG. 6 is a rough diagram of what the digital pulse of FIG. 5 looks like when it is coupled onto node N2. The one digital pulse of FIG. 5, when coupled onto node N2, appears on node N2 as a pair of spike-shaped pulses. The 1.8 volt rising edge of the digital pulse of FIG. 5 is coupled onto node N2 and appears as a positive voltage spike having a decaying waveshape and a peak amplitude of approximately one volt. Similarly, the 1.8 volt falling edge of the digital pulse of FIG. 5 is coupled onto node N2 as a negative voltage spike having a decaying waveshape and a peak amplitude of approximately negative one volt.

The pulse train of spike-shaped pulses of FIG. 6 is communicated through plug 6, through socket 10, and into electrical device 3. From node N2 in electrical device 3, the pulse train is coupled through capacitor 20 onto node N3 and to the DC-ID 19. The pulses are rectified and voltage multiplied by the circuit 24 of FIG. 3. Rectifier and voltage multiplier 24 begins to charge energy storage capacitor 25.

Initially, carrier detect and power on reset (POR) circuitry 29 of integrated circuit 26 keeps a signal ENABLE deasserted. At power up and thereafter, this signal ENABLE is supplied to readout and transmitting logic circuitry 31 in the deasserted state so that the readout and transmitting logic circuitry 31 is held in the disabled state as energy storage capacitor 25 charges and as the voltage on node N4 increases. Readout and transmitting logic circuitry 31 powers up into a disabled state and can only be enabled by assertion of the signal ENABLE.

Over time, as more energizing pulses of the type illustrated in FIG. 6 are received onto electrical device 2, the local supply voltage on node N4 charges energy storage capacitor 25 to approximately 2.0 to 2.5 volts DC. Once charged, energy storage capacitor stores approximately one milliwatt of power that is available for use by integrated circuit 26. The rough local supply voltage on node N4 is supplied to integrated circuit 26. Voltage regulator 27 of integrated circuit 26 uses the rough local supply voltage to output a regulated 1.8 volt supply voltage onto node N5. The regulated 1.8 volt supply voltage on node N5 is used to power other parts of integrated circuit 26 including on-chip oscillator 28, non-volatile memory 30 and readout and transmitting logic circuitry 31. Once powered, on-chip oscillator 28 outputs a digital clock signal that is supplied to the readout and transmitting logic circuitry 31. The circuitry of integrated circuit 26 is maintained in this state with the oscillator oscillating and the readout and transmitting logic circuitry disabled as long as the pulse train transmitted from power supply device 2 continues.

After outputting a predetermined number of pulses onto plug 6, power supply device 2 stops outputting pulses. Carrier detect and power on reset (POR) circuitry 29 within the DC-ID 19 detects this condition, and asserts the signal ENABLE to readout and transmitting logic circuitry 31. Readout and transmitting logic circuitry 31 is then enabled to read out four bits of information from non-volatile memory 30. Readout and transmitting logic circuitry 31 is a state machine that is clocked by the clock signal output by oscillator 28. The four bits of information, once read out of memory 30, are then driven by readout and transmitting logic circuitry 31 onto node N3, one bit at a time, in modulated form.

Figure 7:
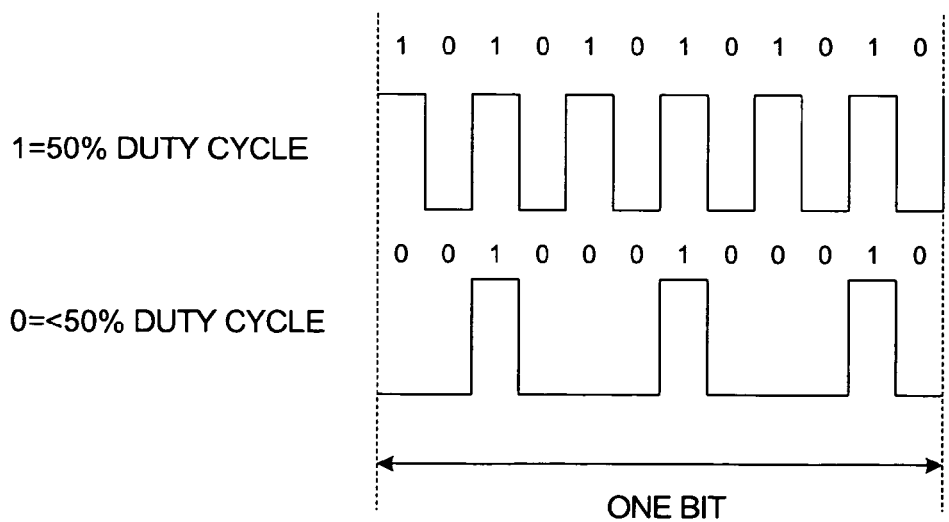
FIG. 7 is a waveform diagram that illustrates how the digital signal output by DC-ID onto node N3 looks when a digital one of information is being communicated from electrical device 3 to power supply device 1, and how the digital signal output by DC-ID onto node N3 looks when a digital zero of information is being communicated from electrical device 3 to power supply device 1.

FIG. 7 is a waveform diagram that illustrates how the digital signal output by DC-ID 19 onto node N3 looks when a digital one of information is being communicated from electrical device 3 to power supply device 1, and how the digital signal output by DC-ID 19 onto node N3 looks when a digital zero of information is being communicated from electrical device 3 to power supply device 1. The modulation is a pulse-skipping frequency shift keying (FSK) scheme. A digital one is modulated as a digital pulse train of a predetermined duration, where the overall duty cycle of the pulse train is fifty percent. A digital zero is modulated as a digital pulse train of the same predetermined duration, where the overall duty cycle of the pulse train is less than fifty percent.

A sequence of four digital pulse trains of the form illustrated in FIG. 7 is driven onto node N3 as the four corresponding bits of information are output. The digital pulses are AC coupled through capacitor 20 onto node N2. Each digital pulse appears on node N2 as a pair of spike-shaped pulses of the type illustrated in FIG. 6. The spike-shaped pulses on node N2 are communicated through socket 10, through plug 6, across power cord 5, and through capacitor 16, and to DC-ID CNTR 15 of power supply device 2. The spike-shaped pulses are converted back into a digital waveform by receiver 46 such that the digital waveform is substantially identical to the digital waveform output by DC-ID 19 onto node N3. If the received digital waveform has a fifty percent duty cycle, then processor 44 determines that a digital one has been received. If the received digital waveform has a duty cycle that is less than fifty percent, then processor 44 determines that a digital zero has been received. In this way, each of the four bits of information is communicated from electrical device 3 to processor 44 in power supply device 2. When four bits of information has been communicated, readout and transmitting logic circuitry 31 stops driving node M3. Processor 44 begins outputting another energizing pulse train via transmitting circuit 47. The energizing digital pulse train is AC coupled through capacitor 16 onto node N2 and appears as a train of spike-shaped pulses of the type illustrated in FIG. 6. As described previously, the energizing pulse train of spike-shaped pulses passes across power cord 5, through plug 6 and socket 10, through capacitor 20 and into DC-ID 19. Energy from this pulse train is used to recharge energy storage capacitor 25. The readout and transmitting logic circuitry 31 is held in a disabled state as long as the pulse train continues to be received onto electrical device 3. When carrier detect circuitry 29 detects that the pulse train is no longer being received onto electrical device 3, then carrier detect circuitry 29 asserts the signal ENABLE that is supplied to readout and transmitting logic circuitry 31. The energy stored in energy storage capacitor 25 is then used to read out the next four bits of information from memory 30 and to output the four bits, one and a time, in modulated form onto node N3. This next four bits of information is communicated as described in connection with the first four bits back to power supply device 2. This process of transferring energy to electrical device 3, reading out four bits of information, and using transferred energy to transmit back the four bits of information to the power supply device 2 is performed repeatedly until a desired number of bits of information has been read out of memory 30 and communicated back to processor 44 in power supply device 2.

Processor 44 analyzes the information and determines how to control programmable DC power supply 14. In the present example, some of the bits of the information are a number that designates a DC voltage that should be supplied onto DC supply voltage socket 10 in order to properly power the principal DC load circuit 23 of electrical device 3. Processor 44 outputs a digital value onto control lines 49 so that the resistance R2 is such that VOUT2 will have the designated voltage amplitude. Processor 44 then asserts VOUT2 ENABLE signal, thereby causing the designated DC supply voltage to be output onto output lead 50. The DC voltage passes through inductor 17, across power cord 5, through plug 6, through socket 10, through inductor 21, and onto a DC voltage input lead 55 of the principal DC load circuit 23. As a result, the principal DC load circuit 23 is powered by energy received from power supply device 2 across the power supply cord 5.

Figure 8:
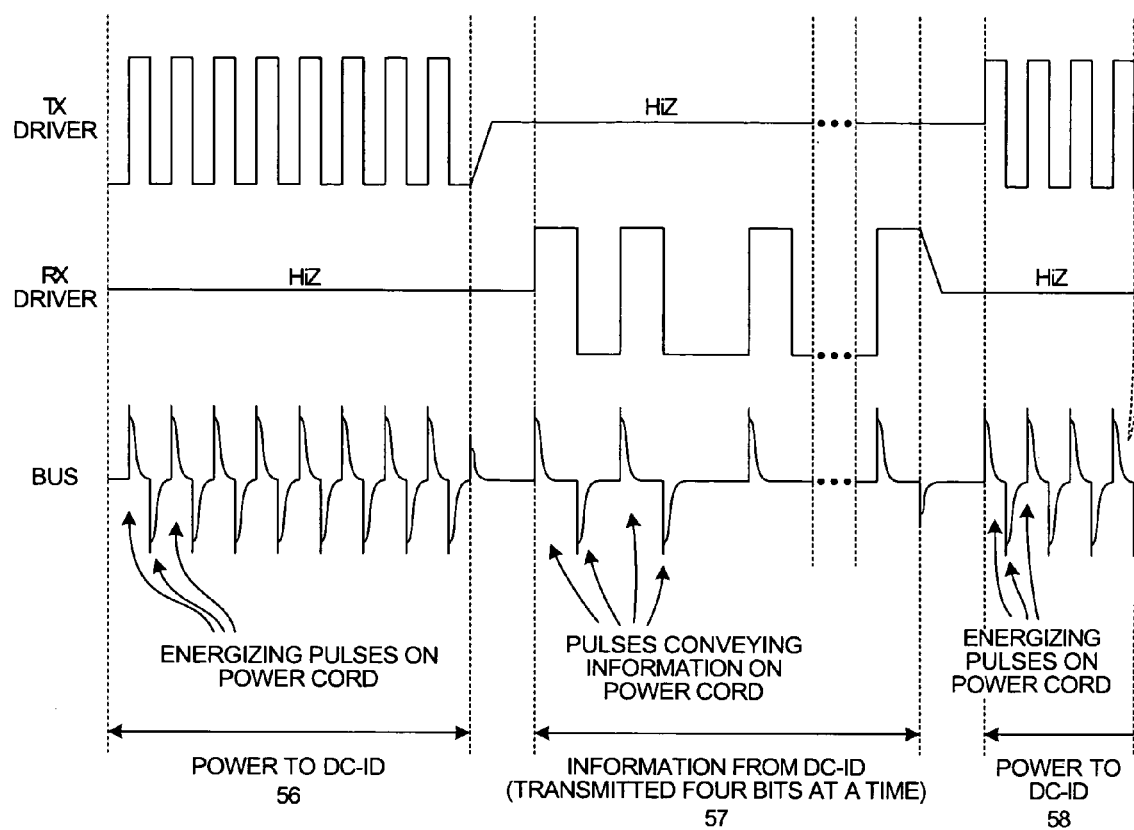
FIG. 8 is a simplified waveform diagram that illustrates the sending of energizing pulses from power supply device 2 to electrical device 3. The diagram also illustrates the sending back of information from electrical device 3 to power supply device 2.

FIG. 8 is a simplified waveform diagram showing an initial energizing pulse train that is sent across the power cord from power supply device 2 to DC-ID 19 of the electrical device 2. This energizing pulse train is sent in initial time period 56. As a result, energy storage capacitor 25 becomes charged. During this time period, the transmitter circuit 47 of power supply device 2 is enabled and driving node N1, whereas the transmitting circuitry 31 of the read out and transmitting logic circuitry 31 of electrical device 3 is in a high-impedance state and is not driving node N3.

In a next time period 57, the carrier detect circuitry 29 detects that the pulse train of time period 56 has stopped. In response, carrier detect circuitry 29 asserts the signal ENABLE, thereby enabling the readout and transmitting logic circuitry 31 of electrical device 3. Energy stored in energy storage capacitor 25 in time period 56 is now used to read four bits of information out of memory 30 and to communicate that information across power cord 5 to power supply device 2 in the form of a pulse train. The transmission circuitry within readout and transmitting logic circuitry 31 is therefore enabled and is driving node N3. The transmitting circuitry 47 of power supply device 2 is in a high-impedance state and is not driving node N1.

In one embodiment, to conserve power while DC-ID 19 is sending information back to power supply device 2, another capacitor (not shown) that is of a smaller capacitance than capacitor 20 is used to capacitively couple DC-ID 19 to node N2 during the transmission. The capacitance of this smaller capacitor is made as small as possible to reduce power consumption when the DC-ID is transmitting, whereas the capacitor 20 is sized to optimize the transfer of energy from conductor 8 into DC-ID 19.

Once four bits of information have been communicated from electrical device 3 to power supply device 2, the process repeats. Reference numeral 58 in FIG. 8 represents the beginning of a subsequent time period wherein energy is sent from power supply device 2 to electrical device 3 in the form of a next set of energizing pulses. It is therefore seen that the communication between power supply device 2 and electrical device 3 is a half-duplex communication in that only one of the two devices is outputting a pulse train onto power cord 5 at a given time.

Figure 9:
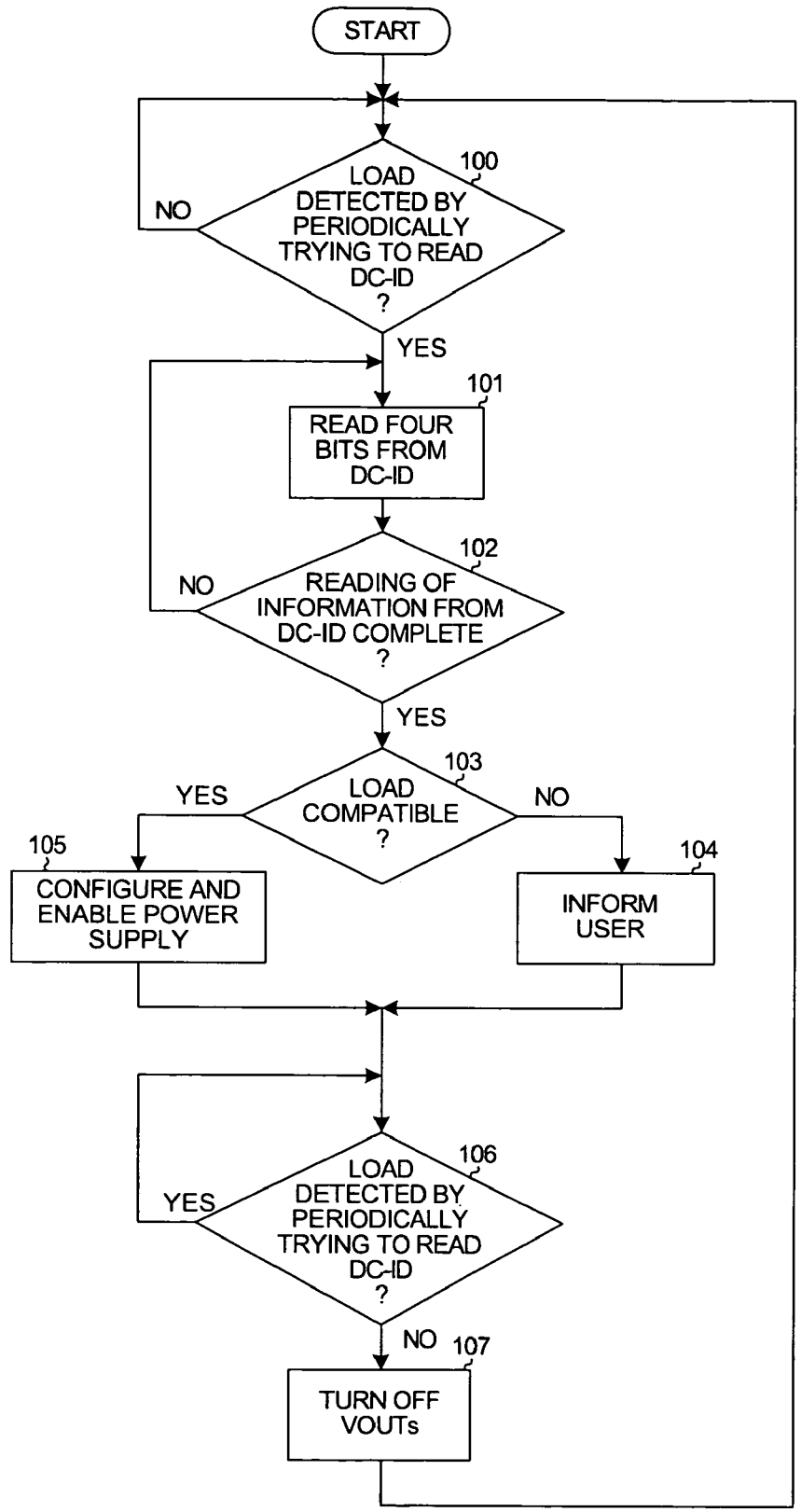
FIG. 9 is a simplified flowchart of a process flow that is performed by software executing in processor 44 of DC-ID CNTR within power supply device 2.

FIG. 9 is a simplified process flow diagram illustrating an operation of system 1 of FIG. 1 from the perspective of processor 44 of power supply device 2. Power supply device 2 periodically checks (step 100) to determine whether it is plugged into an electrical device having a DC-ID. This is done, in one embodiment, by sending out a pulse train as illustrated in FIG. 8 and waiting for a response. If power supply device 2 is properly plugged into a working electrical device 3, then the electrical device 3 will respond by sending back modulated information as illustrated in FIG. 8. If no modulated information is received back, then processor 44 determines that no load has been detected.

If no load is detected, then processing remains in this state with processor 44 periodically attempting detect a load. If, on the other hand, modulated information is received back, then processing proceeds and four bits of information is read from electrical device 3 (step 101) and onto power supply device 2.

If all the information in memory 30 has not been communicated back to power supply device 2, then process of sending out an energizing pulse train and then reading four bits of information back is repeated. If, on the other hand, all the information in memory 30 has been received into processor 44 (step 102), then processor 44 checks (step 103) to confirm that the voltage, current demand, and polarity requirements of electrical device 3 can be met by the power supply device 2. The voltage requirement of electrical device 3 is specified by a number present in the information now in processor 44. The current requirement of electrical device 3 is specified by another number present in the information.

If processor 44 determines that the voltage and current demand requirements cannot be met (for example, the electrical device 3 can draw more current than the programmable DC power supply 14 can deliver reliably), then processor 44 informs the user (step 104) of this situation. In one example, processor 44 drives a light emitting diode (LED) or other indicator on power supply device 2 that is readable by the user. The lighted LED indicates that the power supply device 2 will not try to power the electrical device 3.

If the polarity of the connection between power supply device 2 and electrical device 3 is incorrect, then node N2 in the electrical device 3 may be coupled to conductor 12 in power cord 5 whereas conductor 8 in power cord 8 may be grounded in electrical device 3. In such an incorrect polarity situation, the AC signals on power cord 5 during the read back would be inverted. Accordingly, when electrical device 3 outputs a modulated digital zero having a duty cycle that is less than fifty percent, the power supply device 2 will receive the modulated digital zero as a signal having a duty cycle that is larger the fifty percent. If processor 44 receives information back from electrical device 3 as a sequence of fifty percent duty cycle bits and larger than fifty percent duty cycle bits, then processor 44 determines that the polarity of the connection between power supply device 2 and electrical device 3 is incorrect. In such a situation, processor 44 also drives the light emitting diode (LED) or other indicator on power supply device 2 to indicate the error condition to the user.

If processor 44 determines that the voltage, current, and polarity requirements of the electrical device 3 can be met by power supply device 2, then processor 44 controls the programmable DC power supply 14 as described above such that the DC voltage amplitude is set to the appropriate DC voltage. Once the DC voltage amplitude is set, then processor 44 enables (step 105) the output of the DC voltage onto VOUT2 terminal 50 by asserting VOUT2 ENABLE. Power supply device 2 thereafter powers electrical device 3 by supplying the correct DC voltage as indicated by the information read out of memory 30.

If electrical device 3 becomes disconnected from power supply device 2, then it is desired to turn off programmable DC power supply 14 in order to save power. Conductor 8 of power cord 5 is AC coupled by capacitors 16 and 20 to the DC-ID CNTR 15 in the power supply device 2 and to the DC-ID 19 in the electrical device 3 regardless of whether the programmable DC power supply 14 is outputting VOUT2 or not. The DC-ID CNTR 15 therefore can periodically send out an energizing pulse train and can read back information from memory 30. If information is successfully read back, then it is determined (step 106) that power supply device 2 is still plugged into the electrical device 3 and the programmable DC power supply 14 continues to be enabled to output VOUT2. If, on the other hand, information is not successfully read back, then it is assumed that power supply device 2 is no longer plugged into the electrical device 3. Processor 44 deasserts the VOUT2 ENABLE signal, thereby disabling programmable DC power supply 14 from outputting voltage VOUT2 onto terminal 50.

Although the present invention has been described in connection with certain specific embodiments for instructional purposes, the present invention is not limited thereto. The rate of pulses send across power cord 5, both in the energizing period of operation and in the read back period of operation, can be pseudo-random frequency modulated if need be to disperse electro-magnetic radiation radiated from the system 1. Where the programmable DC power supply 14 outputs a signal that indicates the power supply is supplying power to a DC load, this signal can be used by processor 44 to detect the presence of electrical device 3 in the process of FIG. 9 rather than periodically trying to read information back from DC-ID 19 during the operation of electrical device 3. The technique set forth in connection with FIG. 9 of periodically trying to read information back from DC-ID 19, however, is advantageous in that it detects the presence of electrical device 3 in a situation in which electrical device 3 is coupled to power supply device 2 via power cord 5 but where the principal DC load circuitry 23 has been turned off. In some embodiments, digital information is sent from power supply device 2 to electrical device 3 in the same pulse train that delivers energy to electrical device 3. In some embodiments, power supply device 2 has switches for flipping the polarity of the DC voltage driven onto power cord 5. If the duty cycle of information read back indicates an incorrect polarity as set forth above, then processor 44 controls the switches such that when programmable DC power supply 14 is enabled the proper polarity voltage is output to electrical device 3. Although a barrel-type connector is disclosed at the end of the power cord, the connector in other embodiments is a type of connector that is reversible in the sense that the physical structure of the connector does not enforce a polarity between the contacts of the connector. The plug at the end of the power cord can be a star-shaped plug having multiple plugs of different sizes and shapes. The memory from which the power requirement information is read can be a read-only memory (ROM) such as, for example, a factory mask-programmable ROM or a one time programmable (OTP) memory. The programmable power supply device 2 need not receive power from an AC wall socket, but rather may receive power from another source such as, for example, a cigarette lighter socket in a vehicle.

Although the DC-ID functionality is disclosed as being built into the electrical device 3, in some embodiments the DC-ID 19 as well as capacitors 20 and 22 and inductor 21 are part of a separate DC-ID connector module. The DC-ID connector module has a plug that fits into the socket 10 of the electrical device 3 as well as a socket for receiving plug 6. In a novel business method, the DC-ID connector module is sold so that purchasers can then purchase the DC-ID connector module for use with separately purchased electrical devices that do not include the DC-ID functionality. The memory within the DC-ID connector module is programmed by the user to contain power requirement information specific to the electrical device with which it is to operate. Once programmed, the DC-ID connector module typically will remain plugged into the electrical device 3. When electrical device 3 is to be powered from power supply device 2 employing the DC-ID CNTR, the plug of power supply device is plugged into the socket on the DC-ID connector module. In this way, the DC-ID functionality is provided for use with legacy electrical devices and other electrical devices that do not incorporate DC-ID functionality. Once the power requirement information is read out of the DC-ID connector module, then a DC supply voltage from the power supply device 2 is DC coupled through the DC-ID connector module onto the DC power supply socket 10 of the electrical device. Accordingly, various modifications, adaptations, and combinations of various features of the described embodiments can be practiced without departing from the scope of the invention as set forth in the claims.

What is claimed is:

1. A method comprising:
   (a) receiving an AC signal onto a DC power supply connector of an electrical device, wherein the DC power supply connector has only two contacts, one of the contacts being a ground contact, the other of the contacts being a DC supply voltage contact, and wherein there is substantially no DC voltage between the two contacts during said receiving;
   (b) using the AC signal to generate a local DC supply voltage on the electrical device;
   (c) using the local DC supply voltage to power a reading of a memory in the electrical device such that information is output from the memory;
   (d) using the local DC supply voltage to power an outputting of the information onto the DC power supply connector, wherein during the outputting there is substantially no DC voltage between the two contacts of the DC power supply connector; and
   (e) powering the electrical device from a DC voltage received after (d) onto the DC power supply connector of the electrical device.

2. The method of claim 1, wherein the DC power supply connector is a cylindrical socket connector having a barrel contact and a center contact.

3. The method of claim 1, wherein the electrical device includes a rectifier and voltage multiplier circuit that receives the AC signal, the rectifier and voltage multiplier circuit having an input lead that is coupled to the DC power supply connector via a capacitor, wherein the rectifier and voltage multiplier circuit outputs the local DC supply voltage.

4. The method of claim 1, wherein the information includes voltage amplitude information.

5. The method of claim 1, wherein the information output in (d) includes a first portion and a second portion, and wherein the AC signal received in (a) includes a first plurality of pulses and a second plurality of pulses, wherein the first plurality of pulses is received in (a) and is used to store a first amount of energy in the electrical device, wherein the first amount of energy is then used to power an outputting in (d) of the first portion of information onto the DC power supply connector, and wherein after the outputting of the first portion of information the second plurality of pulses is received in (a) and is used to store a second amount of energy in the electrical device, and wherein the second amount of energy is then used in (d) to power an outputting of the second portion of information onto the DC power supply connector.

6. The method of claim 1, wherein the information is output onto the DC power supply connector in (d) in a modulated form.

7. The method of claim 1, wherein the electrical device comprises:
   a principal DC load circuit that is not drawing substantial power during (a) through (d) through the DC power supply connector;
   an inductor having a first terminal that is coupled to the DC supply voltage contact of the DC power supply connector and a second terminal that is coupled to the principal DC load circuit;
   a circuit that receives the AC signal and generates the local DC supply voltage; and
   a capacitor having a first terminal that is coupled to the DC supply voltage contact of the DC power supply connector, the capacitor having a second terminal that is coupled to the circuit that receives the AC signal.

8. The method of claim 7, wherein the circuit that receives the AC signal further comprises:
   the memory; and
   circuitry that reads said information from the memory and outputs said information onto the second terminal of the capacitor.

9. The method of claim 1, further comprising:
   outputting the AC signal onto a conductor of a power supply cord, the power supply cord being coupled to the electrical device such that the AC signal is received in (a) onto the DC power supply connector of the electrical device;

receiving onto the power supply device the information output from the electrical device in (d); and using the information received onto the power supply device to control an amplitude of a DC output voltage, the DC output voltage being output by a programmable DC power supply device onto the power supply cord such that the DC voltage is received in (e) onto the DC power supply connector of the electrical device.

10. An electrical device, comprising:
a DC power supply input connector having a first contact and a second contact;
a principal DC load circuit having a voltage supply input lead, the voltage supply input lead being DC coupled to the first contact of the DC power supply input connector;
an identification circuit having a node, the node of the identification circuit being AC coupled to the first contact of the DC power supply input connector, the identification circuit comprising:
  a rectifier circuit that converts a first AC signal on the node of the identification circuit into a local DC supply voltage;
  a memory that stores power requirement information and that is powered from the local DC supply voltage; and
  readout and transmitting circuitry that is powered from the local DC supply voltage, the readout and transmitting circuitry reading the power requirement information out of the memory and outputting the power requirement information onto the node in the form of a second AC signal.

11. The electrical device of claim 10, wherein the first AC signal is a pulse train of spike-shaped pulses, and wherein the second AC signal is a digital signal.

12. The electrical device of claim 10, wherein the identification circuit is only powered by energy derived from AC signals present on the DC power supply input connector.

13. The electrical device of claim 10, wherein the DC power supply input connector has no more than two contacts.

14. The electrical device of claim 10, wherein the power requirement information includes information indicative of a DC supply voltage requirement of the electrical device.

15. The electrical device of claim 14, wherein the power requirement information further includes information indicative of a supply current requirement of the electrical device.

16. The electrical device of claim 10, wherein the first AC signal includes a first plurality of pulses and a second plurality of pulses, and wherein the second AC signal includes a first plurality of pulses and a second plurality of pulses, wherein the first plurality of pulses is converted by the rectifier circuit during a first time period, wherein the first plurality of pulses of the second AC signal is output onto the node of the identification circuit during a second time period, wherein the second plurality of pulses of the first AC signal is converted by the rectifier circuit during a third time period, and wherein the second plurality of pulses of the second AC signal is output onto the node of the identification circuit during a fourth time period.

17. The electrical device of claim 10, wherein the memory and the readout and transmitting circuitry are disposed on a single integrated circuit.

18. An electrical device, comprising:
a DC power supply input connector having a first contact and a second contact;
a principal DC load circuit having a voltage supply input lead, the voltage supply input lead being DC coupled to the first contact of the DC power supply input connector; and
means that is AC coupled to the first contact of the DC power supply input connector, the means being for receiving a first AC signal on the first contact of the DC power supply input connector and for using energy in the first AC signal to read power requirement information out of a memory and to output the power requirement information onto the first contact of the DC power supply input connector in the form of a second AC signal, wherein the first AC signal is received onto the electrical device during a first time period, and wherein the second AC signal is output from the electrical device during a second time period.

19. The electrical device of claim 18, wherein there is substantially no DC potential between the first contact and second contact during either the first time period or the second time period.

20. The electrical device of claim 18, wherein the power requirement information includes an indication of a DC supply voltage, and wherein the principal DC load circuit receives the DC supply voltage from the DC power supply input connector at a time after the second time period.

21. A method of determining whether a DC power supply connector of an electrical device has a first polarity or a second polarity, the DC power supply connector having two contacts, the method comprising:
outputting from a power supply device a first AC signal onto the DC power supply connector such that the first AC signal is present between the two contacts, wherein there is substantially no DC voltage between the two contacts of the DC power supply connector during said outputting;
terminating the outputting of the first AC signal;
after the terminating receiving onto the power supply device a second AC signal from the DC power supply connector, the second AC signal having either a first duty cycle characteristic or a second duty cycle characteristic;
determining that the DC power supply connector has the first polarity if the second AC signal has the first duty cycle characteristic; and
determining that the DC power supply connector has the second polarity if the second AC signal has the second duty cycle characteristic.

22. The method of claim 21, wherein the first duty cycle characteristic is a duty cycle of approximately fifty percent or more, and wherein the second duty cycle characteristic is a duty cycle of approximately fifty percent or less.

23. The method of claim 21, wherein if the DC power supply connector is determined to have the first polarity then the power supply device supplies a DC supply voltage onto the DC power supply connector, and wherein if the DC power supply connector is determined to have the second polarity then the power supply device supplies no DC supply voltage onto the DC power supply connector.

* * * * *